United States Patent [19]

Koppa et al.

[11] Patent Number: 4,578,027
[45] Date of Patent: Mar. 25, 1986

[54] DIE HAVING AIR PASSAGES

[75] Inventors: Daniel A. Koppa, Bloomfield; Walter Schaeder, Bergenfield, both of N.J.

[73] Assignee: Nabisco Brands, Inc., Parsippany, N.J.

[21] Appl. No.: 614,859

[22] Filed: May 29, 1984

[51] Int. Cl.$^4$ .................. A21C 5/00; A21C 11/10
[52] U.S. Cl. .................. 425/298; 425/364 R; 425/437; 425/438
[58] Field of Search ............... 426/512, 518; 425/298, 425/437, 438, 383, 218, 364 R

[56] References Cited

U.S. PATENT DOCUMENTS

| | | | |
|---|---|---|---|
| 1,800,890 | 4/1931 | Johnston | 425/298 |
| 1,945,755 | 2/1934 | Scruggs | 425/298 |
| 2,356,406 | 8/1944 | Hislop | 425/298 |
| 4,276,800 | 7/1981 | Koppa et al. | 83/863 |
| 4,460,611 | 7/1984 | Suzuki | 17/32 |

FOREIGN PATENT DOCUMENTS

2078155 1/1982 United Kingdom .............. 425/437

*Primary Examiner*—Willard E. Hoag
*Attorney, Agent, or Firm*—Richard Kornutik

[57] ABSTRACT

An apparatus acts upon an extrudate rope to form individual elements of predetermined size and shape which elements are separated from one another a predetermined distance. A die is used having a predetermined shape with indentations therein to press the extrudate rope against a support at predetermined locations. A conveyor belt is used to carry the extrudate rope in one direction, and the die is supported such that during the pressing operation the die forward speed matches the extrudate rope forward speed. A supporting table underlies the conveyor belt. The die has a pair of generally spherical indentations for shaping pieces from the extrudate rope. The die is formed of a non-stick material such as Teflon ®. A chamber is located in an opposite surface of the die from each respective indentation, to serve as a plenum fluid supply to the indentations, bores connecting the respective opposing chambers to respective indentations. The fluid pressure in each indentation assists separation of a shaped piece of the extrudate rope from respective indentations. A plurality of extrudate ropes may be formed into pieces simultaneously, by using a plurality of dies in parallel, thereby allowing fast and economical separation of the extrudate ropes into pieces.

14 Claims, 12 Drawing Figures

DIE HAVING AIR PASSAGES

BACKGROUND OF THE INVENTION

In the production of individual pieces from a continuous extrudate rope, efforts have been made to form individual pieces which are both regular and uniform, and at the same time which do not leave a high percentage of waste or scrap material. For example, in forming individual pieces from a single extrudate rope, it is known to simply stamp the rope with a die having the shape of the article desired therein. Although somewhat successful, this practice generally results in a relatively high percentage of waste or scrap of the extrudate rope. Due to sticking of small bits of extrudate to the die, it is difficult to maintain perfectly uniform output piece shape and size during production.

In another type of cutter, shown in copending application U.S. Ser. No. 06/507,401, filed 6-24-83, an extrudate rope is cut into pieces leaving generally triangular pieces of scrap. The extrudate rope may be formed with a core of a first composition, and an outer layer of a second composition. In the aforesaid application, two curved blades are employed in cutting the extrudate rope, however the volume between opposing pairs of the blades is left open so that generally triangular pieces of scrap will remain after cutting. Where the volume between each pair of blades is filled in, the inner dough of the extrudate, which may be of a different composition than the outer dough portions, is squeezed away from the scrap portions and toward the central portions of the pieces to be formed. Thus, the triangular scrap portions are substantially composed of the outer layer, and not the core composition; however, in the case where the core material has the particulate matter or chip pieces is not squeezed away from the scrap pieces, but rather remains with the scrap.

The present invention eliminates the need for use of the "rubber dam" type of apparatus. In that type of apparatus, an extrudate travels beneath a reciprocating die head. A rubber sheet or dam is tensioned between two rollers, and is disposed between the extrudate rope and the die head. During operation, the rubber sheet induces release of extrudate rope pieces from the die head, since as the die head moves upward the extrudate rope pieces are contrained by the rubber dam to remain with the conveyor belt and not be taken up with the die. This apparatus has the disadvantages of requiring reportioning of the rubber dam at very frequent intervals, and results in a relatively "messy" operation due to spreading and scattering of the extrudate rope.

In co-pending application U.S. Ser. No. 06/540,983, filed 10-11-83, shims are used, underlying portions of a die head during stamping. This causes dough to be squeezed toward the hollow portions of the mold, used to form the pieces, and thus minimize scrap losses.

In stamping of an extrudate rope, waste occurs during stamping due to spreading of the extrudate rope while under pressure by the die. Thus, portions of the extrudate rope will flow beyond the regions desired for formation of a regular article. Although it is known in the prior art to recover such scrap and attempt to reuse it, this is not always satisfactory.

Recycling of scrap pieces of extrudate rope in the food industry, for example, may be objectionable in cases where the extrudate toughens with exposure to air or otherwise becomes unsuitable for reuse in the stamping operation. Also, where the extrudate rope is formed of two or more materials arranged in different regions to achieve a specific resultant product, recycling of scrap pieces is completely unsatisfactory because such scrap will generally be of a mixture of materials which cannot readily be separated for reuse in an appropriate manner. For example, an extrudate rope may be a cookie dough having an inner core of one type of dough having a first predetermined property with an outer layer surrounding the inner core of a different dough material having a second predetermined property. Thus, scrap pieces generally cannot be recycled from an extrudate rope of this type.

In the prior art stamping operation of Ser. No. 06/507,401, filed 6-24-83, described above, wherein each individual piece is stamped and formed by two opposing blades of the die in a two-stroke operation, highly regular pieces are formed.

It is desirable in any stamping operation that a large number of pieces be formed from an extrudate rope in a minimum amount of time, both to conserve labor costs as well as to conserve floor space taken up by equipment used in the manufacture of such pieces. It is therefore desirable that a plurality of extrudate ropes by operated upon by a single machine simultaneously, thereby permitting a single operator to tend to such machine and for such machine to be arranged in a compact manner to conserve floor space.

In U.S. Pat. No. 3,205,837, issued to R. J. Fay, sintered porous bronze is used to form a die. The die is used in a rotary die roll to produce dough pieces. A low pressure fluid passes through the sintered die to create a film of fluid between the articles and the die. Reference is made to Teflon ® dies or die portions in col. 1 at lines 25,30. No bores are used, however, to provide air directly to the die.

Another type of rotary mold for food products is taught in U.S. Pat. No. 3,427,649, also to Fay. Here also, air is forced through porous die walls to assist in separation of the food products from the die.

SUMMARY OF THE INVENTION

It is accordingly an object of the present invention to provide an apparatus for forming individual pieces from an extrudate rope which minimizes scrap losses.

It is a further object of the present invention to provide an improved apparatus for forming individual pieces from an extrudate rope, wherein air passages are found in a die for stamping individual pieces from an extrudate rope in a multi-step operation and wherein pressurized air is supplied to the passage in the die to assist in separation of the die and the formed pieces of the extrudate rope.

It is a still further object of the present invention to provide an apparatus for forming individual pieces from an extrudate rope having a die, an extrudate rope carried by a conveyor belt, and an underlying support; and air passages disposed in the die head to pressurize a region of the die overlying a shaped portion of the extrudate rope, such that extrudate rope material is forced from an indentation in the, by both air pressure and gravity, die so as to maximize: the speed of production; the quality of the pieces formed; and the yield of acceptable product pieces relative to scrap losses.

It is yet a further object of the present invention to provide an improved die for forming individual pieces from an extrudate rope, wherein the individual pieces are completely identical or uniform, using a Teflon ® die.

It is a still further object of the present invention to provide an improved stamping process and die for forming uniform, identical pieces from an extrudate rope, wherein a single die has a pair of indentations on it as well as front and rear curved forming portions so that an individual piece is formed along its forward edge by the leading edge of the die and in a second stamping operation a trailing edge of the entire individual piece is formed by the trailing indentation of the die.

It is a further object of the present invention to provide an improved apparatus for forming pieces from a extrudate rope, wherein the apparatus has a movable die for stamping, a rope carried by a conveyor belt over a supporting table, the die being forced to travel in the same direction as the conveyor belt at the same speed as the conveyor belt during the stamping operation, so that extrudate material is formed by the die into pieces, air being forces into the indentations in the die where pieces are to be separated from the indentations in the die where pieces are desired to be formed.

Further details and advantages of the present invention appear from the following description of a preferred embodiment shown schematically in the drawings.

DETAILED DESCRIPTION OF THE INVENTION

Figures 1, 5, 6, 7:
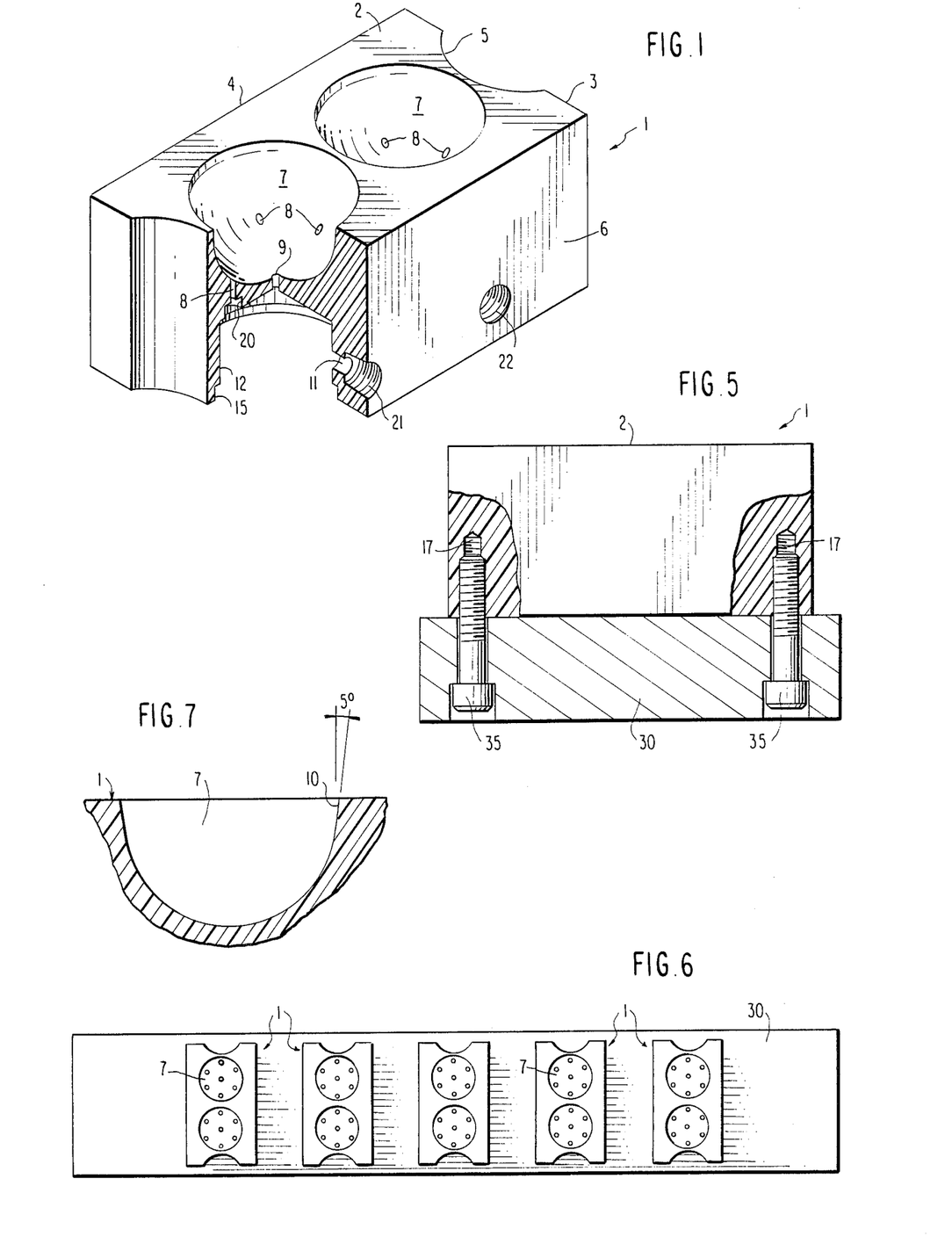
FIG. 1 is a cut-away perspective view, partially in section, of a die of the present invention, showing indents therein.
FIG. 5 is an end view of the die of FIG. 1, showing the die fixed to a bar.
FIG. 6 is a top view of the assembled bar and dies as used in the present invention, showing the top of the dies, and outlines of the indents formed in the dies, as used in the invention.
FIG. 7 is a side view in section of the die showing the indentation shape in detail.

A perspective view of a die used in the present invention is shown in FIG. 1. The die has a forming surface 2 which is adapted to contact an extrudate rope. A pair of generally half-spherical indentations 7 are formed in the surface 2, to form two separate pieces from the extrudate rope in a single step. A cylindrically concave portion 5 is formed in both end walls in the die 1. These are shaped to conform to, respectively, forward and trailing edges of the extrudate rope and a piece already formed from the extrudate rope moving upon a conveyor belt.

Figure 2:
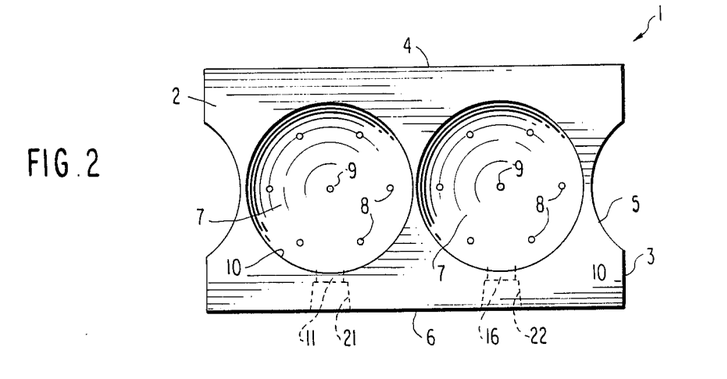
FIG. 2 is a top elevational view of the improved die of the present invention.

FIG. 2 is a top elevational view of the die of the present invention. Here, surface 2 is clearly seen as having two indentations 7 formed therein, the indentations 7 having a generally circular outline at the intersection of the indentation with the surface 2. The indentations 5 are seen as having a shape corresponding to a portion of a radius of a circle, the radius corresponding generally to that of the indentations 7.

A plurality of bores 8 are seen head on in FIG. 2. Also, a pair of bores 9 are seen in FIG. 2. The bores, 8, 9 extend generally perpendicularly to the surface 2, for ease of manufacture since the die 1 is formed from a solid block during manufacture thereof.

Figure 3:
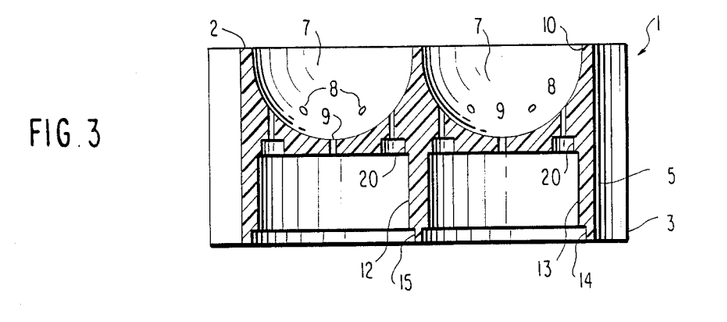
FIG. 3 is a side sectional view of FIG. 2 showing a profile of opposing indents.

FIG. 3 is a side view in section of the die 1, showing the extent of bores 8, 9 toward a pair of chambers 45. The bores 8 are counter bored as at 20 so as to form an enlargement. This is to reduce resistence to air flow along the length of each of bores 8. This is necessary since bore 9 has a shorter length than bores 8 since it is at the deepest point of the spherical depression, which is closest to the air chamber 45.

The air chambers 45 have upstanding, generally cylindrical, side walls 12, 13 respectively. Near the lowermost edge 40 of the die 1 is an enlargement 14, 15 of the respective air chambers 45, leaving a narrow, annular ledge adapted to receive a cover or closure member in the shape of a thin disc 50 (shown in FIG. 11).

A pair of bores 11, 16 are seen in FIG. 3 as formed through respective side walls 12, 13 of the air chambers 45. The bores 11, 16 extend completely through the remaining die material to communicate with the exterior of the die 1. The bores 11, 16 are adapted to permit passage of air from the exterior of the die into the respective chambers 45, and then through respective bores 8, 9 which provide an outlet into the indentations 7.

Figure 8:
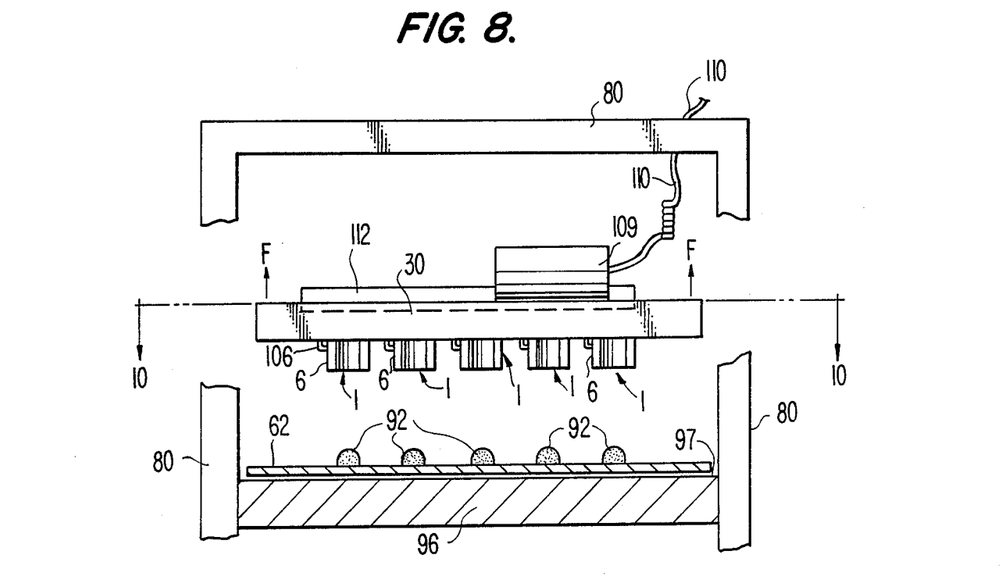
FIG. 8 is a schematic side plan view, partially in section of the die at its top dead center of travel.
Figure 10:
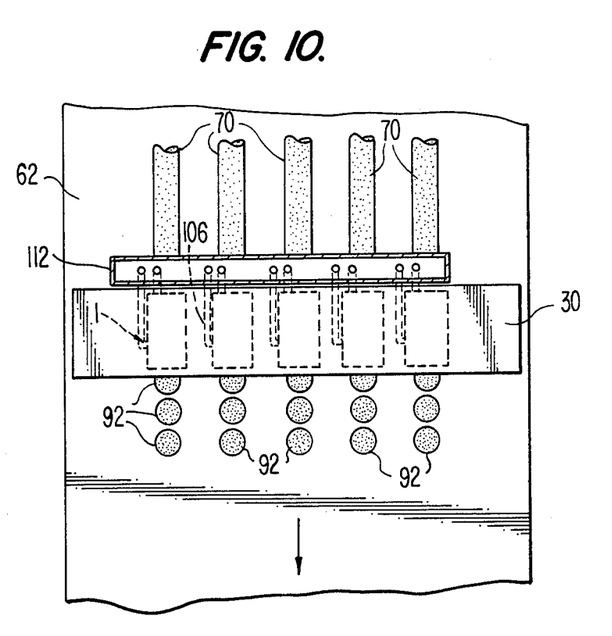
FIG. 10 is a top plan view of the conveyor belt carrying pieces formed from the extrudate rope by the dies of the present invention.

Air may be supplied to the bores 11, 16 by any known method, for example (as shown in FIGS. 8, 10) the use of air hoses inserted into bores 11, 16 respectively. The air hoses may be attached in any known manner, for example by use of a threaded connector, by use of any appropriate adhesive or sealant which is adapted to form a bond between the material forming the hose and the material forming the die 1, which is Teflon ®. If such an adhesive is not readily available, or if a much stronger bond is desired, air may be supplied by attaching an air hose to a metal band, inserting the air hose into a bore 11 or 16, wrapping the band about the body of the die, and fastening the ends of the band together. Any other means of attaching air supply means to provide air to the bores 11, 16 is contemplated of being within the scope of the present invention. For example, a plenum chamber may be fixedly attached to the side 4 of the die 1 so as to simultaneously supply both chambers 45.

Alternatively, the bores 11 and 16 could be plugged or omitted entirely, with the air supply being provided by a member to which the die 1 is attached and supported, the member having an air supply chamber or plenum located adjacent to side 40 of the die 1 when the die is attached to its support member. This is conventional in the fluid handling art.

Figure 4:
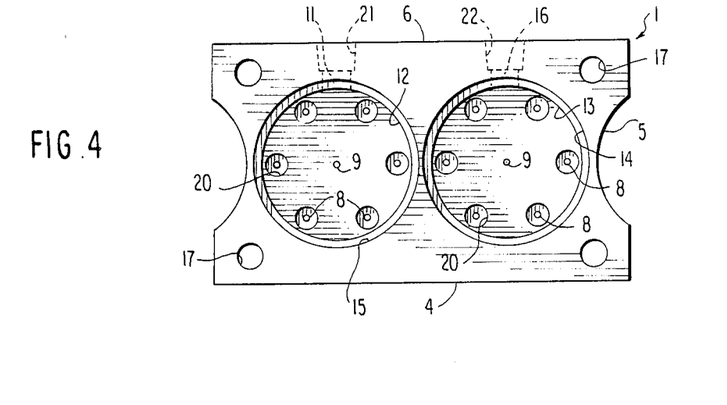
FIG. 4 is a bottom elevational view of the improved apparatus of the present invention, showing the improved die

FIG. 4 is a view of the bottom of the die 1, shown in FIG. 1. Here, the lower surface 40 of the die is seen as having four threaded holes 17. the threaded holes extending only partially into the body of the die 1, as seen in greater detail in FIG. 5. The holes 17 are adapted to receive a fastening member such as a threaded bolt or a screw, so as to retain the die 1 to a support member such as support member 30.

Threaded bores 11, 16 are seen in dotted outline in FIG. 4. They extend generally transversely to side 6 of the die 1. These bores may accept a threaded coupling member. The bores are progressively enlarged so as to have the shape of a truncated cone as indicated at 21, 22 respectively. These portions may also be threaded, to permit the use of a threaded connector for fastening an air hose into the bores 11, 16. This is well known and conventional in the art.

The arrangement of holes 8, 9 in the respective air chambers 45 is seen clearly in FIG. 4. The counterbores 20 are also seen in FIG. 4.

FIG. 5 is a side plan view of the die 1 as it is attached to a support member 30 by means of threaded fasteners 35. Any other type of means of fastening the die 1 to the support member 30 may be used, for example by a tongue-and-groove fitting, banding the die 1 to the support 30, or any other known means of fastening one member to another.

FIG. 6 shows five dies 1 mounted upon a single support member 30. A plurality of air hoses 106 are connected to the dies 1 during operation. The member 30 is mounted to a machine so as to be movable therewith, as described further hereunder. The support member 30 is, in a preferred embodiment formed of aluminum. However, any material may be used so long as it is capable of withstanding the forces needed to press pieces from the extrudate rope.

FIG. 7 is an enlargement of a side view of the indentiation 7. The spherical portion of the indentation 7 is centered at a point slightly below the surface of the die 1, with a very slight flair angle of five degrees from the vertical used to slightly widen the inlet portion of the indentation 7. This permits somewhat easier entry of extrudate material, such as cookie dough, into the indentation 7.

In FIG. 8 is shown a front view of the apparatus of the present invention. A support member 80 for the die is shown schematically and may be any of the known, conventional prior art supports for supporting and moving the die. For example, it is known in the prior art to drive the die upward against a spring and then release the die in a downward direction for the next stamping operation. Any conventional motor or flywheel or other similar drive may be used to accomplish this as is well-known in the art. The driving means resultant force F is shown schematically in FIG. 8 and an arrow is shown indicating a generally upward force applied to the die. Inasmuch as it is also known in the prior art to drive a die both in an upward direction as well as in a downward direction, a spring need not to be used but rather the drive means may drive the die upward as well as downward during successive stamping operations.

A front view of surface 5 of the die is seen in FIG. 8, with the die on an upstroke in the stamping operation. An extrudate rope 70 is shown in cross section. The extrudate rope 70 is carried on conveyor belt 62, which is also shown in cross section. A compressor 109, having a resiliently coiled electrical supply cord 110, is fastened atop the supprt 30. A plenum 112 is fixed behind the support 30, and receives air from the compressor. The air is supplied from the plenum 112 by hoses 106 to respective bores 11, 16 of each die 1.

A support 96 underlies the conveyor belt 62, and is also shown in cross section in FIG. 8. The support 96 has a top surface 97. The support 96 is sufficiently rigid and strong to permit stamping.

Thus, during a stamping operation, initial deformation of the extrudate rope 70 by the top surface 2 of the die 1 tends to cause deformation of the extrudate rope in the vicinity of the die 1 in an outward direction. This spreading of the extrudate rope would result in relatively high scrap losses since those portions of the extrudate rope which spread beyond the appropriate indentation 7 are flattened by the die and spread between indentations 7. It is known to recover and recycle or reuse scrap portions in a stamping operation. However, such reuse or recycling of scrap pieces is not suitable where the extrudate is formed of two dissimilar materials, such as, an inner core of a cookie dough having a first composition and a second, outer layer of cookie dough having a second composition which would result in a bakery product having unique properties. Furthermore, such recycling or reuse is inappropriate where such recycling or reuse results in hardening or other alteration of the properties of the scrap materials. In the case of an extrudate rope which is formed of two dissimilar materials used to achieve a unique bakery product, the scrap pieces would be mixtures of the two materials. Such scrap pieces could not be reused in either the inner core material layer or the outer surrounding layer since the composition of the scrap pieces could not reliably be expected to be either a pure composition of the outer material or of the inner core material. Thus, such scrap pieces would ordinarily be wasted in a stamping operation. Thus, it is important that such scrap be minimized to avoid waste and inefficiency. The die 1 reduces such scrap losses, by forcing the extrudate rope 70 from indentations 7. The Teflon ® material used, combined with the use of air supplied to indentations 7, prevents clogging of the indentations 7 or holes 8, 9 and also prevents sticking of particles of extrudate.

Figure 9:
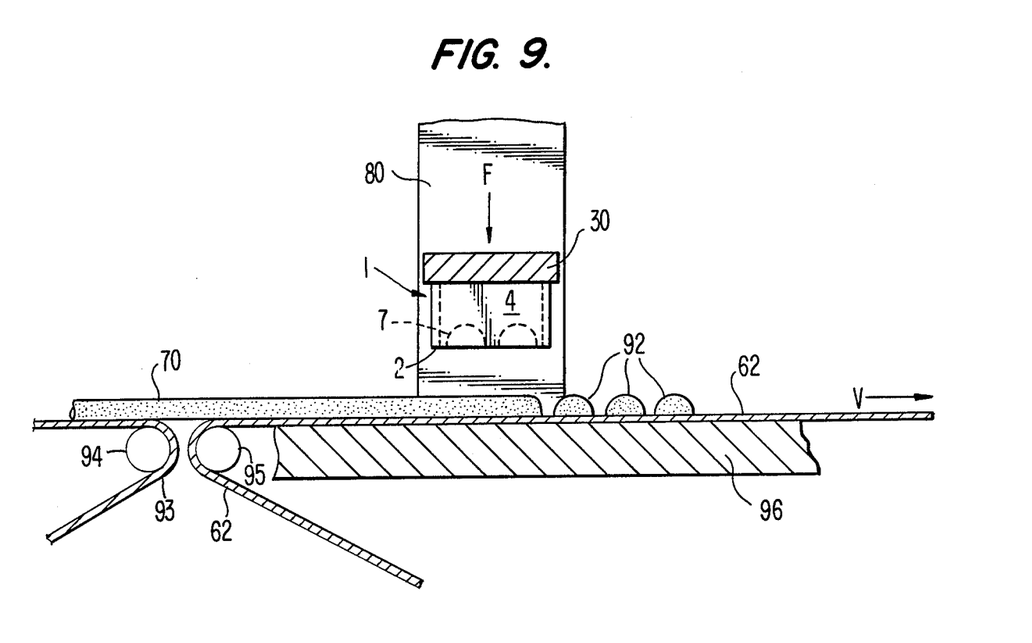
FIG. 9 is a side plan view, partially in section, of the extrudate and die in opertion.

FIG. 9 is a schematic side view of the device of FIG. 8 in partial cross section. Also shown is a side view of an extrudate rope 70, as well as the stamped pieces 92 formed by the stamping operation.

Conveyor belt 62, which supports extruded rope 70 as well pieces 92, is shown mounted in conventional manner upon a roller 95 in FIG. 9. A conventional feed conveyor belt 93 is shown, mounted in conventional fashion upon a roller 94. The present invention, however, is not limited to any particular conveyor belt arrangement. Any conveyor belt arrangement or support may be used. The embodiment shown in FIG. 9 is used merely for illustration purposes.

FIG. 10 is a top plan view of the apparatus of the present invention taken along line 10—10 of FIG. 8. A top surface 10 of the die support 30 is shown in a position of bottom dead center. In this position, the die has formed pieces of the extrudate rope 70 by the indentations 7 formed in of the die.

Overlying the support surface 96 is the conveyor belt 62. The direction of travel of the extrudate rope 70 and conveyor belt in FIG. 10 is from top to bottom as indicated by the arrow.

Figure 11:
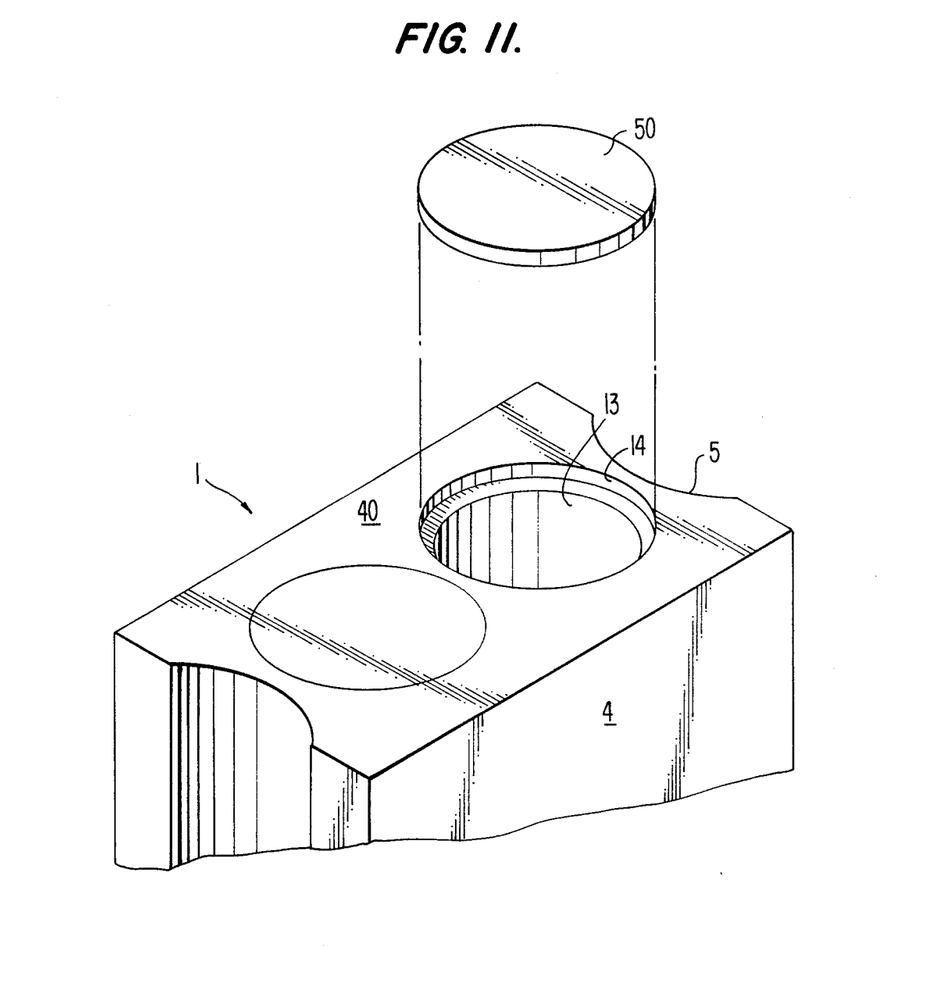
FIG. 11 is an exploded view of the die showing the assembly of a metal cover over the air chamber to prevent air leakage.

FIG. 11 is an exploded view showing the assembly of a cap 50 to cover an air chamber 45. Two caps are used with each die, so that both chambers 45 have a respective cover 50. The caps are prefeably formed of metal, for example aluminum. Each cap 50 is formed as a thin disk. The diameter of each cap 50 is such that it is snugly received within the uppermost circular bore 14 as seen in FIG. 11 and rests upon a ledge (unnumbered). The ledge is clearly shown in FIG. 3 as the portion of the air chamber walls 12, 13 closest to the top of the die 1 seen in FIG. 11. As seen in FIG. 4, the ledge has an annular shape. The caps 50 serve to close the air chambers 45 and greatly reduce air leakage therefrom The caps 50 are retained in place due to assembly of the support 30 to the die 1, blocking removal of the caps.

Figure 12:
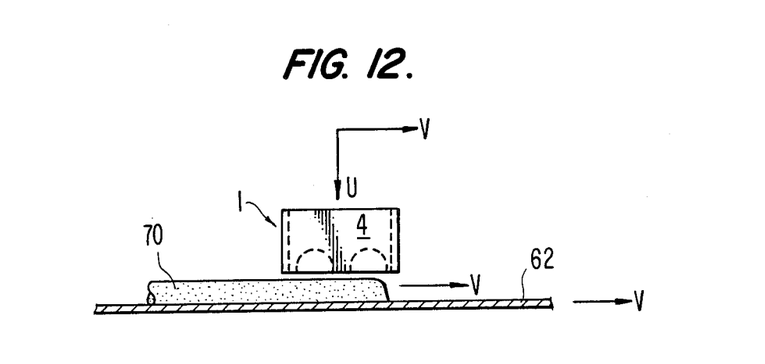
FIG. 12 is a schematic view of the relative motions of the die and the extrudate rope.

FIG. 12 shows a downward stroke of the die 70 in stamping operation. As can be seen from the drawing, the extrudate rope 70 has a velocity V in the righthand direction. Matching this velocity V in the righthand direction, is the die 1. The die 1 also has a downward component of velocity U. The downward velocity U allows the die to perform the stamping operation.

The forward velocities V of the die and extrudate rope 70 match in order to ensure that during the stamping operation no deformation of extrudate rope occurs due to different relative velocities of portions of the extrudate rope under the die in the conveyor belt. Thus the extrudate rope and conveyor belt move with the same velocity, and so does the die, whereby all analysis and calculations of the stamping operation may consider the extrudate rope 70, the conveyor belt 62, and the die 1 to be at rest in one frame of reference.

In operation, conveyor belt 93 is supported by a roller 94 to deliver an extrudate rope 70 to a second converyor belt 62 which in turn is supported by a roller 95. Other rollers and means for driving the rollers are not shown, but are conventional in the art of supporting and driving conveyor belts.

The extrudate rope 70 travels under a die having indentations 7. The die is driven upward and downward in a stamping operation to form pieces 92 from the extrudate rope 70. It is conventional in the stamping art to drive a die upward against a spring and then on the downstroke allow the stored energy of the spring and the momentum of the die to perform the stamping. It is also conventional to only apply force on the upstroke, letting the die fall on the downstroke. It is also conventional to apply force to the die both on the upstroke as well as on the downstroke.

During the bottom of the downstroke, and the beginning of the upstroke, the die matches the velocity V of the conveyor belt 62. This minimizes distortion of the extrudate rope which would otherwise be caused by any disparity between the velocity of the die and the extrudate rope 70. This air is supplied under pressure to the chambers 45 so as to assist separation of the extrudate rope 70 and the formed pieces 92 from respective dies 1 during the forming operation. Gravity aids the separation process as the die is raised, with the air pressure assuring fast separation without significant deformation of the pieces 92.

The extrudate rope can be any viscous, fluidic material. In the present invention, the extrudate rope 70 is composed of cookie dough. The stamping operation thus creates pieces 92 which are baked to form baked goods. However, it is contemplated any of a variety of baked goods may be formed, for example baked goods that are baked from dough pieces having an outer layer of farinacious dough and a core which may be a dissimilar dough or another material such as a jam, cream, puree, paste, or other extrudable form of fruit, cheese, meat, vegetable, confection or other edible substance."

During stamping, downward movement of the die initially deforms the extrudate outward beyond the areas beneath indentations 7. As the die continues downward, however, the lower die surface 2 squeezes the spread-out portions of extrudate rope 70 between surface 2 and belt 62. Due to the low friction between the extrudate rope 70 and the Teflon ® die 1, the extrudate rope 70 easily enters the indentations 7, and relatively little spreading, due to friction, of the extrudate rope 70 occurs. Also, the Teflon ® material allows relatively easy separation of pieces 92 from the die 1. The portions of surface 1 between opposed pairs of indentations 7 thus exerts force on the extrudate rope, and squeezes portions the extrudate rope 70 from between opposed indentations 7 to form separate pieces 62. The pieces 62 are then conveyed for further processing if such is required, for example baking. The die then travels upward and back for another operation.

The indentations 7 need not be spherical, but rather may have any desired shape so as to form pieces of a corresponding shape from the extrudate rope 70. Additonally, the indentations 7 may have any designs formed thereon or therein, so as to impart indecia or a patter upon the pieces produced from extrudate rope 70.

Air may be continously supplied to the dies 1 during the entire cycle of operation of the apparatus of the present invention. In a preferred embodiment, air is supplied approximately one-third of the cycle of operation, beginning at the location where the die just contacts the top of the extrudate rope 70, and continuing to supply air through the cycle until the point where the lowermost surface of the dies 1 is just above the level of the uppermost portions of the pieces 92 formed from the extrudate rope 70. In this case, any known means may be used to provide air pressure to the air chambers during this portion of the cylce. For example, a valve member actuated by a cam which is rotatably mounted to a rotating part of the drive used to operate the support member 30 (such devices being conventional in the prior art) may be used to control air flow to the plenum 112. Alternatively, a valve member can also be manually actuated by an operator, although this is not preferred. Alternatively, a timer which is synchronized to operate an air valve to admit air to the hoses which supply the air chambers 45, can be provided and adjusted so as to relatively precisely match the operating speed of the device to provide air during the desired interval.

However, air may not be supplied during that specific portion of the cycle referred to hereinabove, but rather may be supplied at any stage after initial contact of the die 1 with the extrudate rope 70. For example, air may be applied only from the bottom dead center of the stroke for a brief instant to assist separation of the die from the extrudate rope 70. The optimum use and length of stroke having air pressure applied to the air chambers 45, would vary from situation to situation depending upon the size of the pieces to be cut, the shape of the pieces desired, the chemical composition and nature of the extrudate rope 70, the length of time the extrudate ropes 70 had been exposed to air, and so on. All uses of air in conjunction with the present invention, and during any portions of the cycle, are contemplated as being within the scope of the present invention.

The improved die and apparatus of the present invention is capable of achieving the above-enumerated objects and while preferred embodiments of the present invention have been disclosed, it will be understood that it is not limited thereto but may be otherwise embodied within the scope of the following claims.

What is claimed is:

1. An apparatus for producing separated pieces from an extrudate rope, comprising:
   a die having a lower surface;
   said lower surface having at least one indentation formed therein;
   a means for driving said die in a cyclic operation having an upstroke and a downstroke, in which said die travels during a portion of its operation with a downward velocity as well as a forward velocity;
   a means for conveying an extrudate rope under said generally flat surface of said die;
   and at least one passage through a portion of said die;
   a supply of fluid communicating with said passage;
   said die having a vertical leading surface and a vertical trailing surface;
   a leading indentation intersection a portion of said leading surface and said bottom surface;
   a trailing indentation intersecting said trailing vertical surface and said bottom surface;
   whereby said die moves downward against the extrudate rope to separate the extrudate rope into pieces, the lower surface of said die and said means for conveying forcing dough therebetween toward said at least one indentation, thereby forming the extrudate rope into pieces during cyclic operation of said die; and
   whereby during a stamping operating said trailing indentation forms a leading edge of a piece of extrudate rope, while simultaneously said leading indentation conforms to a trailing edge of a trailing piece previously formed from extrudate rope.

2. An apparatus as claimed in claim 1, wherein said die has two indentations formed in said lower surface;
   whereby two pieces are formed during a single operating cycle of said die.

3. An apparatus 1, wherein said die is composed of a low-friction material.

4. An apparatus as claimed in claim 1, wherein said die is composed of Teflon ®.

5. An apparatus as claimed in claim 2, wherein said indentations comprise a surface generally having the shape of a portion of a sphere.

6. An apparatus as claimed in claim 1, wherein said at least one indentation comprises a portion of an ellipsoid.

7. An apparatus as claimed in claim 1, wherein said at least one indentation comprises a prismatic rectangular shape.

8. An apparatus as claimed in claim 1, wherein the interior surface of said at least one indentation has a pattern formed thereon;
   whereby a pattern is formed on the pieces formed from the extrudate rope during operation.

9. An apparatus as claimed in claim 1, wherein said die is driven by said means for driving in an upward direction on the upstroke and is driven in a downward direction on the downstroke.

10. An apparatus as claimed in claim 1, wherein said die is driven upward by said means for driving against the force of a resilient member;
   and on the downstoke said die is driven downward by the release of stored energy in said resilient member.

11. An apparatus as claimed in claim 1, wherein said passage communicates with an outer surface of said die and with said indentation;
   whereby fluid passes from said supply of fluid through said passage, to assist separation of the die from the pieces formed by the indentations in the die from the extrudate rope.

12. An apparatus as claimed in claim 11, said die further including a chamber separated a pre-determined distance from said indent;
   said chamber communicating with said indentation by at least a first orifice;
   said chamber communicating with an exterior surface of said die by a second orifice;
   said one passage including said second orifice, said chamber, and said first orifice;
   whereby fluid is allowed to pass from the exterior surface of said die to said indentation.

13. An apparatus as claimed in claim 12, wherein a plurality of orifices communicate with said indentation and said chambers;
   said orifices being adapted to accomodate flowing fluid therethrough.

14. An apparatus for producing separate pieces from an extrudate rope, comprising:
   a die having a lower surface;
   said lower surface having at least one indentation formed therein;
   a means for driving said die in a cyclic operation having an upstroke and a downstroke, in which said die travels during a portion of its operation with a downward velocity as well as a forward velocity;
   a means for conveying an extrudate rope under said generally flat surface of said die;
   and at least one passage through a portion of said die;
   a supply of fluid communicating with said passage;
   whereby said die moves downward against the extrudate rope to separate the extrudate rope into pieces, the lower surface of said die and said means for conveying forcing dough therebetween toward said at least one indentation, thereby forming the extrudate rope into pieces during cyclic operation of said die;
   said die being composed of a low-friction material;
   said extrudate rope having an outer layer of farinacious dough and a core of dissimilar material;
   said indentations comprising a surface generally having the shape of a portion of a shpere;
   said die having a vertical leading surface and a vertical trailing surface;
   a leading indentation intersecting a portion of said leading surface and said bottom surface;
   a trailing indentation intersecting said trailing vertical surface and said bottom surface;
   whereby during a stamping operation said trailing indentation forms a leading edge of a piece of extrudate rope, while simultaneously said leading indentation conforms to a trailing edge of a trailing piece previously formed from extrudate rope.

* * * * *